(12) United States Patent
Batalion

(10) Patent No.: US 10,607,218 B1
(45) Date of Patent: Mar. 31, 2020

(54) FACILITATING END-TO-END ENCRYPTION FOR E-COMMERCE

(75) Inventor: Aaron Batalion, Washington, DC (US)

(73) Assignee: LIVINGSOCIAL, INC., Washington, DC (US)

(*) Notice: Subject to any disclaimer, the term of this patent is extended or adjusted under 35 U.S.C. 154(b) by 1261 days.

(21) Appl. No.: 13/467,168

(22) Filed: May 9, 2012

Related U.S. Application Data

(60) Provisional application No. 61/484,027, filed on May 9, 2011.

(51) Int. Cl.
*G06Q 20/40* (2012.01)
*G06Q 20/16* (2012.01)

(52) U.S. Cl.
CPC ............ *G06Q 20/40* (2013.01); *G06Q 20/16* (2013.01)

(58) Field of Classification Search
CPC ...... G06F 21/10; G06F 21/78; G07F 17/3253; G07F 17/3258; G07F 9/02; G06Q 20/383; G06Q 20/40; G06Q 30/02; G06Q 30/0201; G06Q 40/025; G06Q 30/0207; G06Q 30/0212; G06Q 40/06; G06Q 30/0241; G06Q 20/10; G06Q 20/341; G06Q 20/20
See application file for complete search history.

(56) References Cited

U.S. PATENT DOCUMENTS

| | | | | |
|---|---|---|---|---|
| 5,122,950 A * | 6/1992 | Benton | ................. | G06Q 20/04 235/379 |
| 5,679,940 A * | 10/1997 | Templeton | ............. | G06Q 20/04 235/375 |
| 6,976,053 B1 * | 12/2005 | Tripp | ................ | G06F 17/30864 707/999.102 |
| 7,107,242 B1 * | 9/2006 | Vasil | ...................... | G06Q 20/10 705/35 |
| 8,046,256 B2 * | 10/2011 | Chien | ..................... | G06Q 20/04 705/14.33 |
| 2001/0051922 A1 * | 12/2001 | Waller | ................. | G06Q 20/102 705/43 |
| 2001/0056398 A1 * | 12/2001 | Scheirer | ................ | G06Q 40/02 705/38 |
| 2002/0013899 A1 * | 1/2002 | Faul | ..................... | G06Q 20/401 713/156 |
| 2002/0073066 A1 * | 6/2002 | Coutts | .................... | G06Q 30/06 |
| 2002/0116341 A1 * | 8/2002 | Hogan | .................. | G06Q 20/04 705/64 |
| 2002/0195486 A1 * | 12/2002 | Erb | ........................ | G06Q 20/04 235/379 |
| 2004/0029567 A1 * | 2/2004 | Timmins | ............. | H04M 3/4931 455/412.1 |
| 2004/0128378 A1 * | 7/2004 | Blakley, III | ............ | G06F 21/41 709/224 |
| 2004/0151292 A1 * | 8/2004 | Larsen | .................. | H04M 15/00 379/114.2 |
| 2004/0193553 A1 * | 9/2004 | Lloyd | ................ | G06Q 20/0855 705/78 |

(Continued)

*Primary Examiner* — Johann Y Choo

(74) *Attorney, Agent, or Firm* — Alston & Bird LLP

(57) ABSTRACT

A transaction intermediary configured to receive a transaction request, enable the input of transaction information, receive a transaction package including the inputted transaction information, route the transaction package to a processing location, receive an indication that the transaction package has been processed, and generate an electronic voucher in response to the indication.

18 Claims, 6 Drawing Sheets

(56) References Cited

U.S. PATENT DOCUMENTS

| | | | | |
|---|---|---|---|---|
| 2006/0047603 | A1* | 3/2006 | Fontijn | G06F 21/10 705/54 |
| 2006/0100952 | A1* | 5/2006 | Heimke | G06Q 30/02 705/37 |
| 2008/0013726 | A1* | 1/2008 | Kuriya | H04N 7/1675 380/210 |
| 2009/0048993 | A1* | 2/2009 | Lohrbach | G06F 21/6281 706/45 |
| 2010/0185992 | A1* | 7/2010 | Auerbach | G06F 8/34 716/106 |
| 2010/0262508 | A1* | 10/2010 | Volnak | G06Q 30/02 705/26.1 |
| 2011/0161233 | A1* | 6/2011 | Tieken | G06Q 20/04 705/71 |
| 2011/0167173 | A1* | 7/2011 | Bansal | H03M 7/30 709/247 |
| 2012/0036069 | A1* | 2/2012 | Silvestre | G06Q 20/10 705/42 |
| 2012/0066501 | A1* | 3/2012 | Xiong | G06F 21/32 713/171 |
| 2012/0253901 | A1* | 10/2012 | Montgomery | G06Q 30/02 705/14.5 |

* cited by examiner

| 110 | 120 | 130 | 140 | 150 |
|---|---|---|---|---|
| User ID | User Location | Merchant | Routing Location | Deal Model |
| ABC123 | City A | Merchant A | Secure Point 1 | Deal Model 1 |
| JM333 | City A | Merchant B | Secure Point 1 | Deal Model 2 |
| ABC123 | City A | Merchant A | Secure Point 1 | Deal Model 1 |
| Bell95 | City B | Merchant D | Secure Point 2 | Deal Model 3 |

210  Deal Model 3

220

US 10,607,218 B1

FACILITATING END-TO-END ENCRYPTION FOR E-COMMERCE

CROSS-REFERENCE TO RELATED APPLICATION

This application claims priority from U.S. Provisional Application No. 61/484,027, filed May 9, 2011, and titled "Facilitating End-to-End Encryption for E-Commerce," which is incorporated by reference.

TECHNICAL FIELD

This document relates to encryption for e-commerce.

BACKGROUND

Electronic commerce (e-commerce) generally describes the process of buying and selling goods and services over the internet. Increased usage of the internet has resulted in e-commerce becoming an increasingly important component for facilitating business transactions.

OVERVIEW

In one general aspect, processing secure information over the internet may be improved by using a transaction intermediary that is configured to receive a request to perform a transaction from a client device, enable the client device to enter transaction information in a form, receive a transaction package containing the transaction information in the form to facilitate the execution of the transaction, route the transaction to a transaction processor, receive an indication from the transaction processor that the transaction package has been processed, and generate an electronic voucher for a subsequent retail transaction based on the indication sent from the transaction processor.

Implementations may include one or more of the following features. For example, the indication may include a token that includes information corresponding to validation of the transaction information in the information package. Other implementations may include determining the status of the transaction from the token and then storing the status on the transaction intermediary. Yet another implementation may include determining that the status of the transaction may be recorded on a list and updated on a user account associated with the transaction.

The transaction package may be encrypted. The encryption may be generated from at least one encryption module residing on the client device. The encryption module may include a PGP encryption module. The encrypted transaction package may be decrypted in the transaction processor. The transaction information in the decrypted transaction package may be stored in the transaction processor, where the transaction package may include payment method information, retail vendor information, and user identification information.

Implementations may include a system capable of achieving the above features, including, for instance, a user device, a transaction intermediary, a transaction processor, and a network between these components.

DESCRIPTION OF DRAWINGS

FIG. 1 is an illustration of a transaction list maintained upon receiving a transaction package from a user's device.

DETAILED DESCRIPTION

Figure 2A:
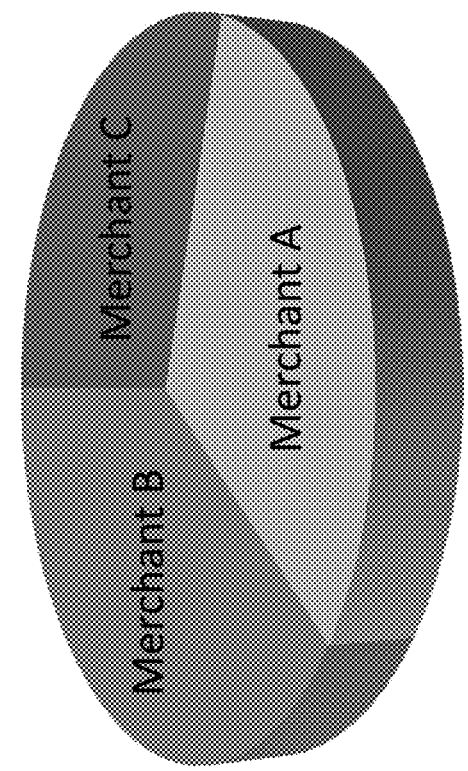
FIG. 2A is a diagram of a first group of graphical data output from the transaction list.

A transaction intermediary may be configured facilitate transactions between a user community, a vendor, and a transaction processor. Specifically, a transaction intermediary may be configured to propose one or more details (e.g., a "deal" to dine at a particular restaurant) to a user community. One or more users then may accept the offer and provide the necessary information into a form that facilitates the transaction. For example, the transaction intermediary may propose a 50% discount if the user agrees to pay now and dine under specified circumstances.

The transaction intermediary provides the form that includes payment information. However, the transaction intermediary may seek to avoid exposure with sensitive information, such as the user's credit card number. The form provided by the transaction intermediary may include javascript code that creates a transaction package that is encrypted on a client device (e.g., a smart phone). The transaction intermediary receives the encrypted transaction package and routes the transaction package to the transaction processor for processing. The transaction processor may include a bank or credit card processing system that is configured to decrypt the transaction package and execute the proposed transaction. The transaction processor then provides an indication that the transaction has been executed so that the transaction intermediary may generate an electronic voucher (e.g., a coupon that can be printed out) for use in a subsequent retail opportunity such as a dinner reservation. In one configuration, the transaction processor maintains a private key for the user's account and provides a public key to the transaction intermediary for distribution in the form that is completed to begin generating the transaction package. In another configuration, key distribution architecture is used that facilitates distribution of symmetric private key pairs.

A transaction intermediary may maintain a data list that specifies where a particular transaction package should be routed. Referring to FIG. 1, a data list 100 is illustrated that displays where a received transaction package may be routed for processing. A transaction package may include information related to a proposed transaction between a user and a merchant. The transaction package may include at least one piece of transaction information, such as, for example, a user's payment information such as credit card numbers, credit card expiration dates, bank account numbers, etc. The transaction information may also include a user's mailing address, phone number, social security number, or other personal information that identifies the user. Furthermore, the transaction information may include identification information related to the identification of a particular merchant with whom the user is considering engaging in the transaction (e.g., the merchant's name, tax identification number, mailing address, phone number, or other information that identifies the merchant).

The received transaction package may be associated with a user account 110 through which the user engages the transaction intermediary for the purpose of executing a proposed transaction. This user account may be accessed via a web page. Once a user has accessed their account, the user may accept a proposed transaction offered by a merchant 130. The merchant's transaction may be tied with a certain deal model 150 that the merchant may be offering to the user. This deal model 150, may take a variety of forms, such as a reduced price on a product or service that the merchant normally offers, a special limited time product or service that the merchant is offering, or any other special deal model that the merchant may offer to facilitate a retail purchase.

Once a user has selected or accepted a proposed transaction, the user may be prompted to enter their transaction information into a form. Upon the user acknowledging the completion of the form, the transaction information that they entered into the form may be encrypted on the user's system as a transaction package. Based on characteristics of this transaction, such as the merchant 130, the location of the user 120, the deal model 150, the 15 user's payment method (i.e. through VISA™, MASTERCARD™, Debt Account, PAYPAL™, etc.), information associated with the user account 110, etc., a routing location 140 can be determined. The routing location 140 is a remote device able to act as a transaction processor where the encrypted user information is decrypted to execute the proposed transaction.

The encrypted transaction package may be sent through the web tier, such that it can be readily associated with a user account and a user's chosen transaction. As a result, a label for the proposed user's transaction may be entered into data list 100 in order to identify the transaction intermediary as having routed the encrypted transaction package. Data list 100 then may be used to facilitate in processing subsequent transactions. Data list 100 may be stored in data structure that allows it to be represented on a graphic user interface (GUI) in a table form as shown in 100.

Figure 2B:
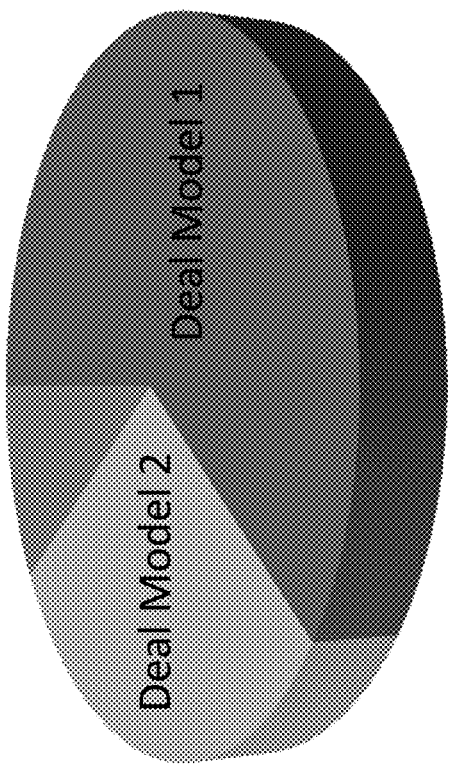
FIG. 2B is a diagram of a second group of graphical data output from the transaction list.

Referring to FIGS. 2A and 2B, data in data list 100 can also be shown in graphical form. For instance, information pertaining to the volume of deal models 150 that a certain remote location 140 has handled in a certain time frame, may be outputted as a pie chart 210. Likewise, information pertaining to the volume of transactions per merchant 130 that a remote location 140 has handled in a certain time frame, may be outputted as a pie chart 220.

It should be understood that data list 100 may be outputted in many other graphical manners as can be found in the known art of graphically outputting data in list form. Data list 100 then may be fed into an analytic and modeling engine that can be used to visualize the profitability for one or more proposed vendor partnerships depending on the particular terms of the proposed transaction. For example, the extent to which users are already registered with payment information may be used to determine the acceptance rate and profitability of a proposed transaction.

Figure 3:
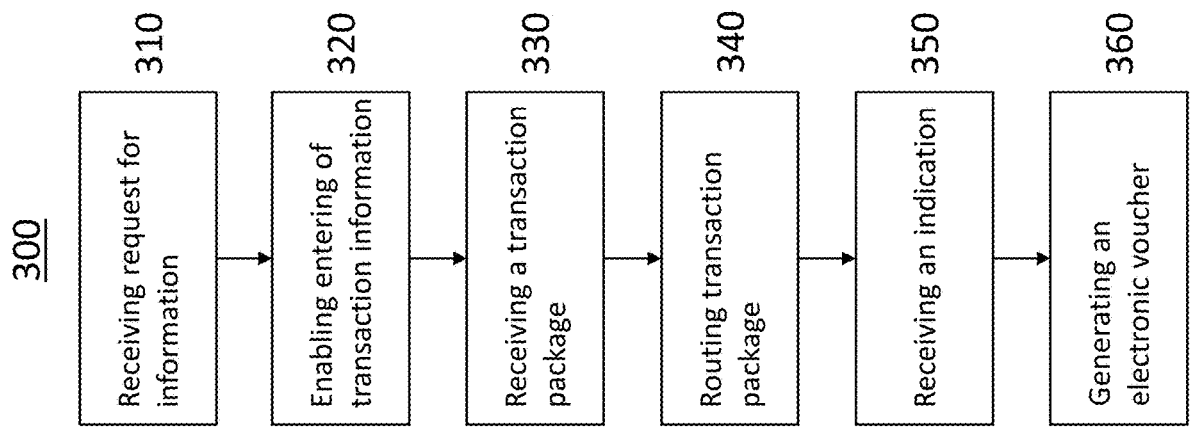
FIG. 3 is a flow chart illustrating a method for enabling a secure transaction.
Figure 4:
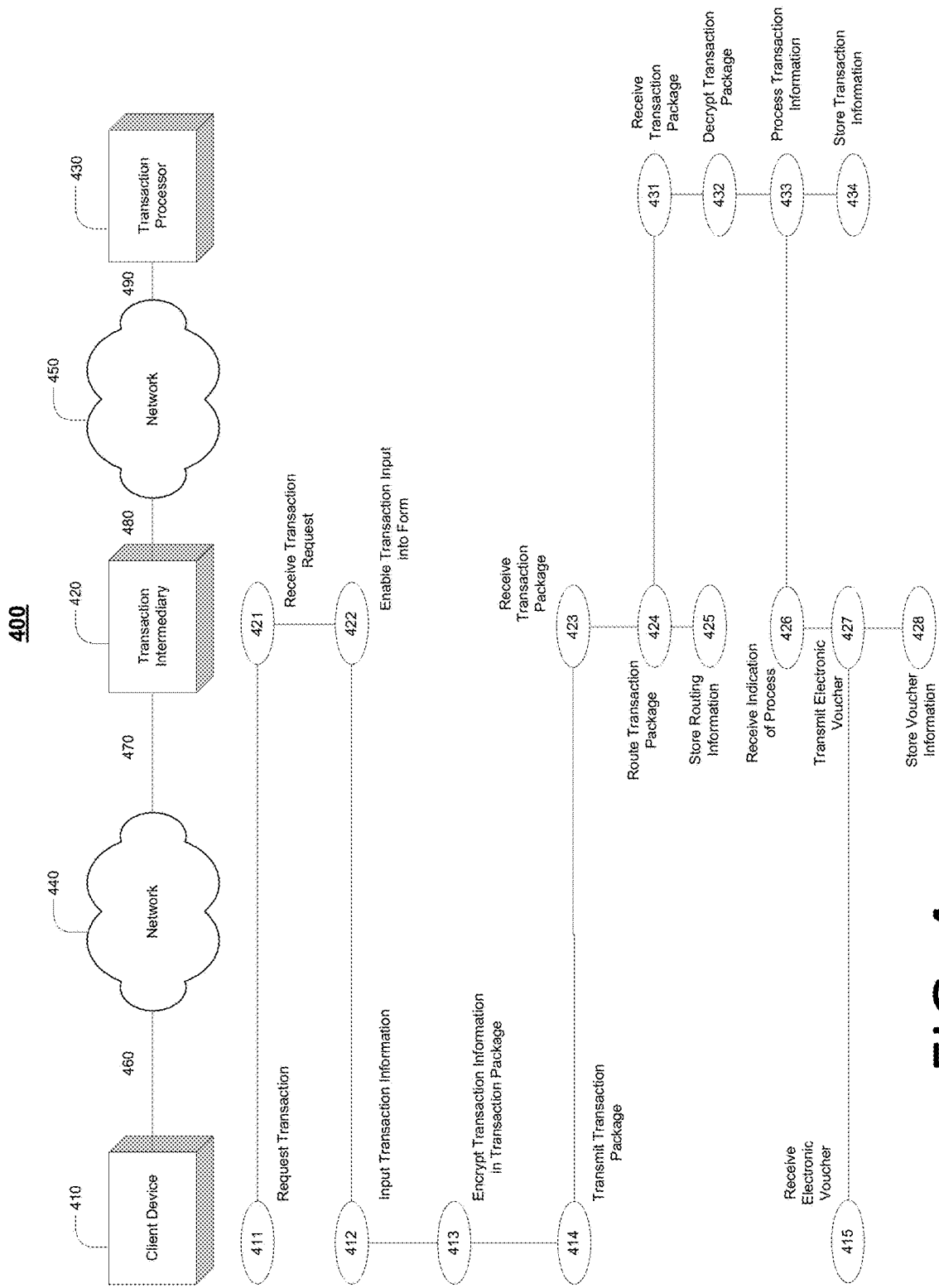
FIG. 4 is a flowchart illustrating the transaction information moving through a communications system.

FIG. 3 illustrates a process for enabling a user to execute a transaction through a transaction intermediary with a merchant. At step 310, a request for a transaction is received from a user device (e.g., a smart phone). The request may come from a user selecting certain transaction when they access their user account on a web page. Alternatively, the user may choose a transaction from a list of transactions that they can generally access from a web page without having to access a user account. A transaction may be tied to one or more offers provided by one or more merchants across multiple geographic locations.

Once the user has chosen a transaction, step 320 enables the user to enter their transaction information into a form. The form may be provided through an encrypted portion of the web page which the user has accessed to choose the deal. The transaction information entered into the form by the user can include the user's payment method (i.e. through VISA™, MASTERCARD™, Debt Account, PAYPAL™, etc.), payment information (i.e. account numbers, 20 account expiration dates, etc.). This transaction information may also include a user's mailing address, phone number, social security number, or other personal information that can identify the user. Furthermore, certain transaction information may be imbedded into the form such as merchant information (i.e. merchant name, merchant tax identification number, merchant mailing address, merchant phone number, etc.). A web browser on the user device 25 may, for example, load a javascript package that securely encrypts credit card information. The javascript package may encrypt this information using a public key for a transaction processor. The transaction package may include the encrypted information that is sent to the transaction intermediary for routing to the transaction processor.

A transaction package, that includes the transaction information, is then received in step 330 and routed in step 340 to an appropriate location where the transaction information can be processed. The location for routing may be determined based on the user's transaction request, the user's location, the merchant connected with the transaction, the user's payment method, or information associated with information in the user's account.

In step 350, an indication is received that indicates if the transaction information in the transaction package has been validated. This indication may be in the form of a token indicating that the information was valid or not valid. In response to the receiving this indication, an electronic voucher is generated in step 360 which the user can redeem and use in a subsequent retail opportunity tied with the transaction. The voucher may be accessible through the user's account, may be mailed emailed to the user, or through merchant associated with the transaction. The voucher may be generated when there is an indication that the transaction was valid, or may be generated with an indication that the voucher was not valid.

Figure 5:
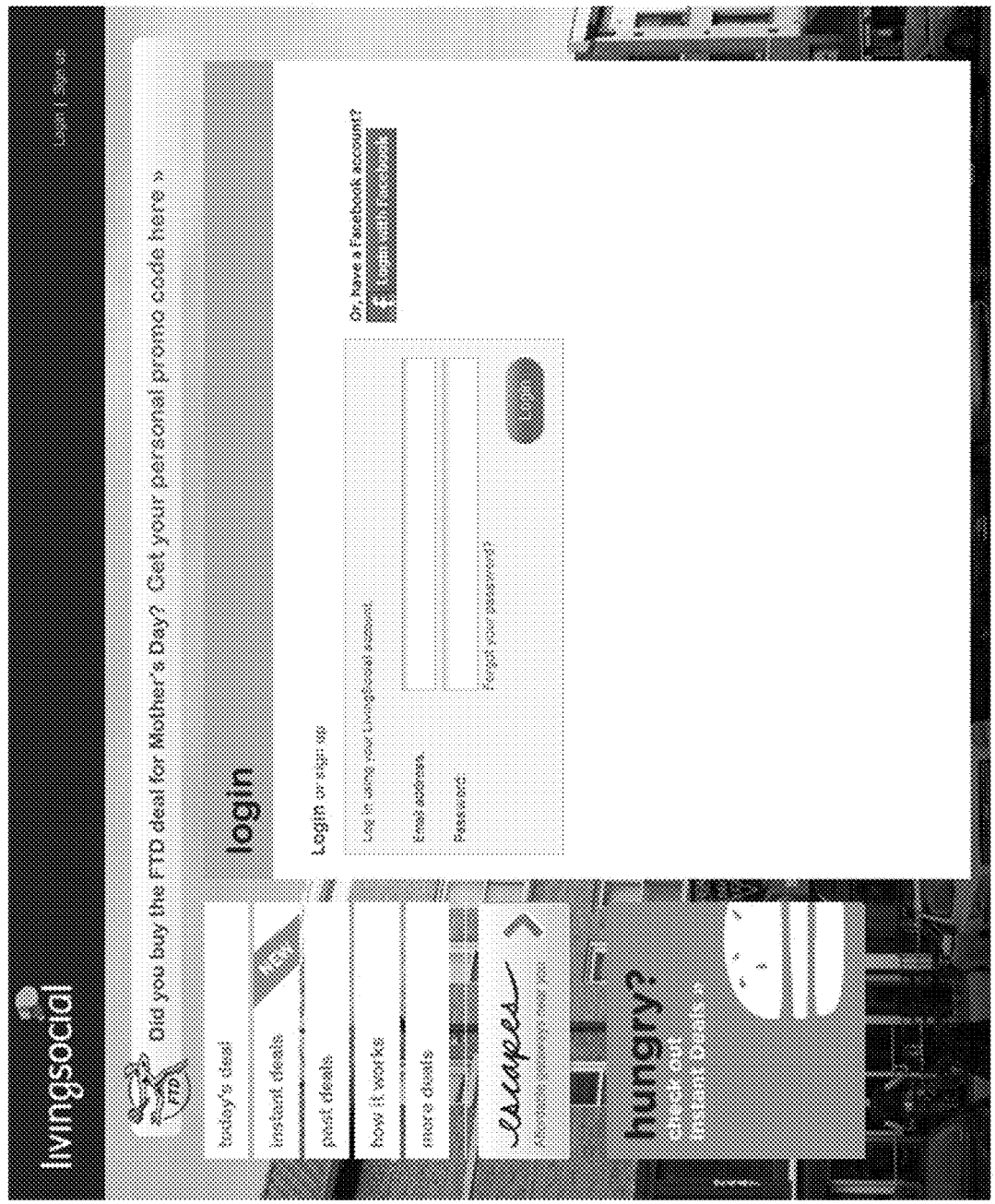
FIG. 5 is a login web page provided by the transaction intermediary that a user on a client device can access to login into a user account.

Referring to FIG. 5, a communication system 400 may be structured and arranged to facilitate communications with a client device 410, at least one transaction intermediary 420, at least one transaction processor 430 and communication software and hardware enabling communications between client device 410, transaction intermediary 420 and transaction processor 430. More particularly, the communications system 400 typically includes a client device 410, a transaction intermediary 420, a transaction processor 430, a network 440 between the client device and a network 450 between the transaction intermediary 420 and the transaction processor 430. As will be described in greater detail with respect to FIG. 5, the client device 410 generally transmits requests and transactions packages across network 440 to one or more transaction processors 420, where the transaction packages or portions thereof, are routed to at least one transaction processor through network 450.

Typically, a client device 410 may be structured and arranged to facilitate user communications such that a user of the client device may access web pages in order to facilitate a user request for a transaction across network 440. The client device 410 may include a general-purpose computer having a central processor unit (CPU), and memory/storage devices that store data and various programs such as an operating system and one or more application programs. Other examples of a client device 410 includes but is not limited to a smart phone, a PDA, a tablet device, a workstation, a server, a device, a special purpose device or component, a broadcast system, other mobile communication device, or some combination thereof capable of responding to and executing instructions in a defined manner. The client device 410 also typically includes an input/output (I/O) device (e.g., video and audio input and conversion capability), and peripheral equipment such as a display communications card or device (e.g., a modem or a network adapter) for exchanging data with the network 440.

A communications link 460 is used to communicate data between the client device 410 and network 440. Communications link 460 may include a telephone line, a wireless network link, a cable network, or a direct connection, for example.

The network 440 typically includes hardware and/or software capable of enabling direct or indirect communications between the client device 410 and the transaction intermediary 420. The network 440 may include a direct link between the client device 410 and the transaction intermediary 420, or it may include one or more networks or subnetworks between them (not explicitly shown). Each network or subnetwork may include, for example, a wired or wireless data pathway capable of carrying and receiving data. Examples of network 440 include the Internet, the World Wide Web, a WAN ("Wide Area Network"), a LAN ("Local Area Networks"), an analog or a digital wired and wireless telephone network (e.g., PSTN ("Public Switched Telephone Network"), an ISDN ("Integrated Services Digital Network"), xDSL ("any form of Digital Subscriber Loop"), and/or a radio, television, cable, satellite, or any other delivery mechanism for carrying data.

A communications link 470 is used to communicate data between the network 440 and the transaction intermediary 420. Communications link 470 may include a telephone line, a wireless network link, a cable network, or a direct connection, for example.

The transaction intermediary 420 typically is structured and arranged to receive a request for a transaction, enable a user of the client device to complete a form with transaction information and receive a transaction package from the user which includes at least some of the entered transaction information. The transaction intermediary 420 is also structured and arranged to route the transaction information to a transaction processor 430 without processing the transaction information in the transaction package. Furthermore, the transaction intermediary 420 is structured and arranged to receive an indication that the transaction has been processed by the transaction processor 430 and generate an electronic voucher in response to receiving this indication.

In some implementations, a transaction intermediary 420 is structured and arranged to receive the transaction package through the web tier. In some implementations, a transaction intermediary 420 can route this information to the transaction processor 430 through a different web tier as the one used to receive the transaction package.

The transaction intermediary 420 may include a controller (not shown) that processes instructions received from or generated by a software application, a program, a piece of code, a device, a computer, a computer system, or a combination thereof, which independently or collectively direct operations of the transaction intermediary 420. The instructions may be embodied permanently or temporarily in any type of machine, component, equipment, storage medium, or propagated signal that is capable of being delivered to the transaction intermediary 420 or that may reside with the controller at transaction intermediary 420. Transaction intermediary 420 may include a general-purpose computer (e.g., a personal computer, PDA, smart phone, etc.) capable of responding to and executing instructions in a defined manner capable of responding to and executing instructions.

For instance, in one implementation, the transaction intermediary 420 includes one or more information retrieval support software applications (e.g., a web server and database) capable of receiving and routing one or more transaction packages. The information retrieval support applications may run on a general purpose operating system and a hardware platform that includes a general purpose processor and specialized hardware for graphics, communications and/or other capabilities.

Generally, transaction intermediary 420 may also include one or more electronic storage mediums (not shown) for storing and updating information based on receiving a transaction package and receiving information from client device 410 and transaction processor 430.

Transaction packages received by transaction intermediary 420 may be accessed by or sent to transaction processor 430 through network 450 via communications link 480. Communications link 480 may include a telephone line, a wireless network link, a cable network, or a direct connection, for example.

Network 450 is structured and arranged to receive transaction packages transmitted from the transaction processor 430 for transmission to the transaction processor 430.

The network 450 may include hardware and/or software capable of enabling direct or indirect communications between the transaction intermediary 420 and the transaction processor 430. As such, the network 450 may include a direct link between the transaction intermediary 420 and the transaction processor 430, or it may include one or more networks or subnetworks between them (not shown). Each network or subnetwork may include, for example, a wired or, wireless data pathway capable of carrying and receiving data. Examples of the delivery network include the Internet, the World Wide Web, WANs, LANs, analog or digital wired and wireless telephone networks (e.g., PSTN, ISDN, or xDSL), radio, television, cable, satellite, and/or any other delivery mechanism for carrying data. Network 440 and network 450 may share one or more hardware or software devices.

A communications link 490 is used to communicate data between the network 450 and the transaction processor 430. Communications link 480 may include a telephone line, a wireless network link, a cable network, or a direct connection, for example.

The transaction processor 430 may include one or more devices capable of receiving and processing the transaction package transmitted by transaction intermediary 420 through network 450. The transaction processor 430 may include a controller (not shown) that processes instructions received from or generated by a software application, a program, a piece of code, a device, a computer, a computer system, or a combination thereof, which independently or collectively direct operations of the transaction processor 430. The instructions may be embodied permanently or temporarily in any type of machine, component, equipment, storage medium, or propagated signal that is capable of being delivered to the transaction processor 430 or that may reside with the controller at transaction processor 430. Transaction processor 430 may include a general-purpose computer (e.g., a personal computer, PDA, smart phone, etc.) capable of responding to and executing instructions in a defined manner capable of responding to and executing instructions.

For instance, in one implementation, the transaction processor 430 includes one or more information retrieval software applications (e.g., a browser, a mail application, an instant messaging client, an Internet service provider client, or other integrated client) capable of receiving one or more transaction packages. The information retrieval applications may run on a general purpose operating system and a hardware platform that includes a general purpose processor and specialized hardware for graphics, communications and/or other capabilities. In another implementation, transaction processor 430 may include one or more information decrypting software applications capable of decrypting one or more transaction packages. In yet another implementation, transaction processor 430 may include one or more electronic storage mediums for storing and updating information based on transaction information processed in the transaction package received information from transaction intermediary 420.

The transaction flow from a client device 410 to transaction processor 430, through transaction intermediary 420 begins with a request for a transaction 411 from the client device 410. The request is received at step 421 in the transaction intermediary 420. After going through any type of verification process known in the art, the transaction intermediary enables the user to input transaction information electronically into a form at step 422.

Once enabled to enter transaction information electronically, a user through the client device 410, can enter transaction information into the form at step 421. Once acknowledging that the form is complete, the entered transaction information is either partially or fully encrypted in the client device 410 into a transaction package at step 413 using software, hardware, or a combination of the two. The encryption may be achieved using at least one encryption algorithm residing on the client device. One of these encryption algorithms may include PGP ("Pretty Good Privacy") encryption. At step 414, the client device 410 may then transmit the encrypted transaction package, via a web tier, to the transaction intermediary 420.

The transaction package is received in the transaction intermediary 420 at step 423 and based on characteristics of the transaction, routed at step 424 to the transaction processor 430. Information on the transaction, including routing information, may be stored in the transaction intermediary at step 425. For example, although the transaction intermediary may not store sensitive information (e.g., a credit card number), the transaction intermediary may store a metadata label that includes a higher description of the user account and their payment information to assist in routing additional transactions.

The routed transaction package is received in the transaction processor 430 at step 431 and is then subsequently decrypted in step 432 using software, hardware, or a combination of the two. In step 433, the decrypted transaction information in the transaction package is then processed in the transaction processor 430 to verify that it is valid. This verification may entail matching the information to at least one data base that includes verification parameters and user records. After the verification, an indication is generated which indicates whether the transaction information in the transaction package was valid or not. This information may be in the form of token. This information is then sent from the transaction processor 430 to the transaction intermediary 420. Information processed in step 433 may then be stored on the transaction processor in step 434.

The indication is received in the transaction intermediary 426 and is processed to determine whether an electronic voucher for a subsequent sales transaction may be made available to the user of the client device 410. If it is determined that the indication allows for an electronic voucher to be made available to the user of client device 410, an electronic voucher is transmitted to the user in step 427. This transmission may be made directly to the client device 410, made available on a user's account profile that the transaction intermediary 420 can update, or may be emailed to the user and or merchant. In the case of being sent to a merchant, the user is sent an indication in step 427 that the transaction was successful. In step 428, information pertaining to the status of the transaction, i.e. successful or not, may be stored on the transaction intermediary 420. The transaction intermediary 420 may also, in step 428, update a user account associated with the transaction with information on the transaction as well as further transaction choices. Voucher information may also be stored in step 428. Furthermore, the status of transaction may be updated on a list or database stored in step 428 on the transaction intermediary 420.

The user on client device 410, then receives an acknowledgement in step 415 that the transaction was successful. They may receive this acknowledgement and the electronic voucher through any of the above methods.

Figure 6:
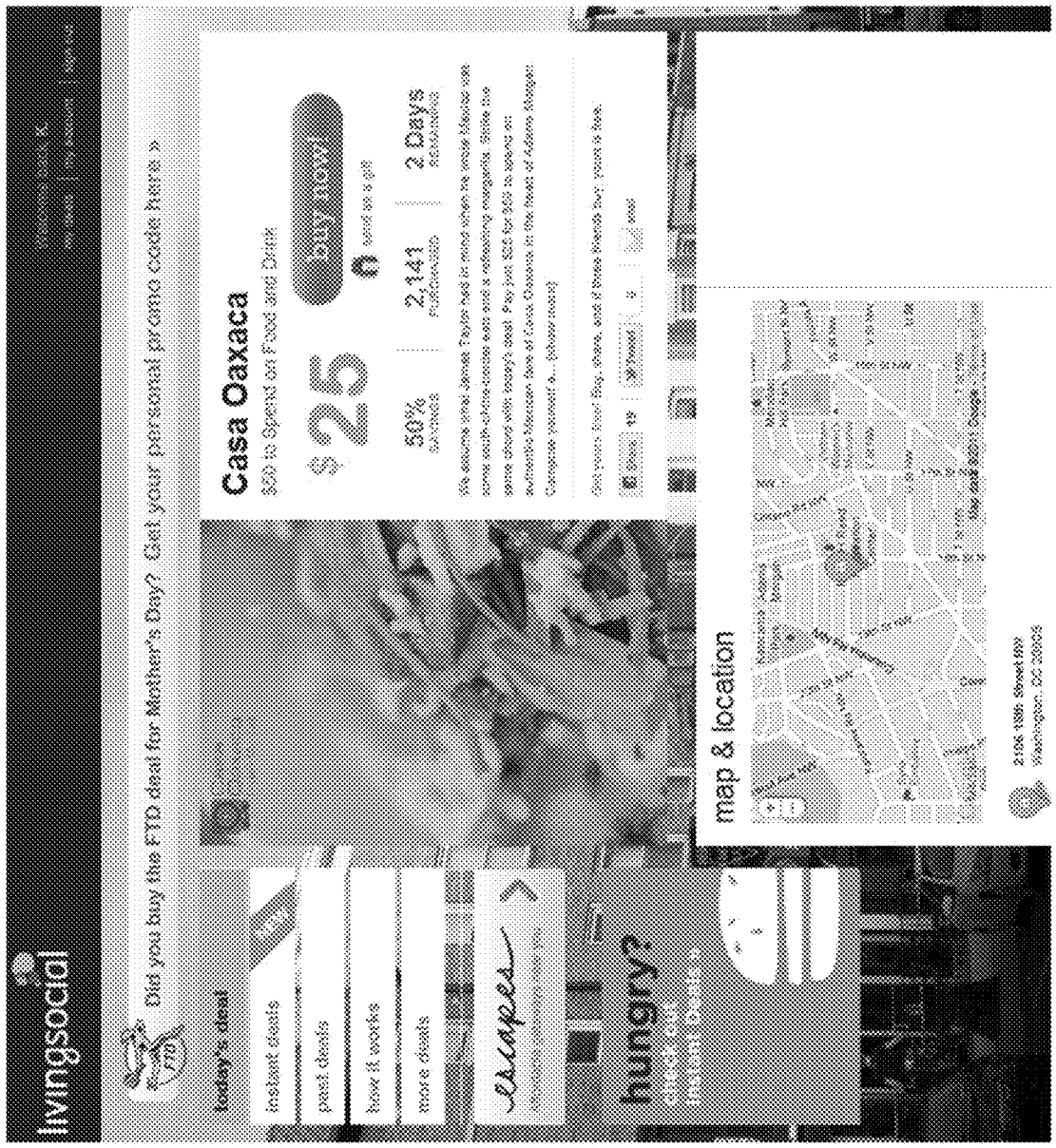
FIG. 6 is a web page enabled by the transaction intermediary that provides a user with transaction possibilities after they have logged into their account.

FIG. 5 shows an example of a web portal that allows the user to access a web page in which they may make transaction choices in. The user can enter a user id and user password in the web portal in order to gain access to the web page with transaction choices. In other implementations, user id and user passwords are not necessary to gain access to a web page with transaction choices. The web portal may be hosted on the transaction intermediary 420, or may be modified in any manner through the transaction intermediary 420. FIG. 6 shows an example of a welcome web page after a user has logged in that displays a transaction option that the user can select. Once the user has selected this transaction, they are directed to an electronic form to fill in transaction information pertaining to the particular transaction choice. The web page that includes transaction information along with the web page with the form may be hosted on the transaction intermediary 420, or may be modified in any manner through the transaction intermediary 420.

The disclosed and other implementations can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks.

However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular configurations. Certain features that are described in this document in the context of separate configurations can also be implemented in combination in a single configuration. Conversely, various features that are described in the context of a single configuration can also be implemented in multiple configurations separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of processing information, the method comprising:

receiving, by a transaction intermediary and from a client device, a request for information related to a transaction, the transaction intermediary being an intermediary between a client device and one or more transaction processors and being connected to the client device and the one or more transaction processors through one or more networks;

transmitting, by the transaction intermediary to the client device, data to generate a form through which transaction information is received, the form comprising one or more portions through which data to be encrypted is received and one or more second portions through which data that is not to be encrypted is received;

receiving, by the transaction intermediary and from the client device, a transaction package to facilitate execution of the transaction, the transaction package comprising an encrypted portion and a non-encrypted portion, the encrypted portion comprising encrypted data that is received through the one or more portions, the encrypted data comprising a whole payment account number corresponding to a user account for payment of the transaction, the non-encrypted portion comprising data received through the one or more second portions of the form and metadata indicative of one or more from a group comprising a merchant associated with the transaction, a location of the client device, a deal model associated with the transaction, and a payment method for the transaction;

processing, by the transaction intermediary, the transaction package to extract and store the non-encrypted portion comprising data received through the one or more second portions of the form and metadata in a data list and without decrypting the whole payment account number in the encrypted portion of the transaction package;

determining, by the transaction intermediary and using an analytics engine, a likely acceptance rate of the transaction and a profitability of the transaction based on at least the extracted non-encrypted portion of the transaction package and on users that are previously registered with the transaction intermediary;

determining, by the transaction intermediary, at least one routing location associated with at least one transaction processors based, at least in part, on (i) the location of the client device and (ii) the extracted metadata in the non-encrypted portion of the transaction package that comprises information identifying a location where the encrypted portion of the transaction package is to be decrypted;

routing, using the transaction intermediary, the encrypted portion of the transaction package to the at least one routing location associated with the at least one transaction processors;

storing, by the transaction intermediary, a transmittal indicator indicating that the transaction intermediary has routed the transaction package to the transaction processor;

receiving an indication that the transaction processor has processed the transaction package in response to decrypting the encrypted portion of the transaction package and determining that the transaction information of the transaction package is valid; and generating, in response to receiving the indication that the transaction processor has processed the transaction package, an electronic voucher for use in a subsequent retail opportunity in response to analyzing a generated token of the indication verifying that the transaction information is valid.

2. The method of claim 1, further comprising:
determining a status of the transaction from the token; and
storing, by the transaction intermediary, information related to the status of the transaction.

3. The method of claim 2, further comprising:
recording the status of the transaction on a list; and
updating, in the transaction intermediary, a user account associated with the transaction.

4. The method of claim 1, wherein:
the data to generate the form comprises public key information that (i) is provided by the transaction processor and (ii) provides encryption information to encrypt the data received through the one or more portions of the form; and
the encrypted portion of the transaction package is encrypted using Pretty Good Privacy (PGP) encryption.

5. The method of claim 1, wherein the transaction package comprises at least one of:
payment method information;
merchant information; and
user identification information.

6. The method of claim 1, wherein storing, by the transaction intermediary, the routing information to route the transaction package to the transaction processor using the extracted non-encrypted portion of the transaction package comprises determining a location of the transaction processor based on at least data indicative of the location of the client device, the deal model associated with the transaction, and the payment method for the transaction.

7. The method of claim 1, further comprising:
updating, based on at least the extracted non-encrypted portion of the transaction package, the data list with information indicative of a volume of transactions per merchant and a volume of deal models handled at a particular location; and
outputting, in a graphical presentation, the updated information indicative of one or more of the volume of transactions per merchant and the volume of deal models handled at a particular location.

8. The method of claim 7, further comprising:
determining one or more of a profit per transaction or a profit per merchant partnership based on at least the updated information indicative of one or more of the volume of transactions per merchant and the volume of deal models handled at a particular location.

9. A system configured to process information, the system comprising:
a processor; and
a storage medium storing instructions, which when executed on the processor, cause the processor to perform operations comprising:
receiving, by a transaction intermediary and from a client device, a request for information related to a transaction, the transaction intermediary being an intermediary between a client device and one or more transaction processors and being connected to the client device and the one or more transaction processors through one or more networks;
transmitting, by the transaction intermediary to the client device, data to generate a form through which transaction information is received, the form comprising one or more portions through which data to be encrypted is received and one or more second portions through which data that is not to be encrypted is received;
receiving, by the transaction intermediary and from the client device, a transaction package to facilitate execution of the transaction, the transaction package comprising an encrypted portion and a non-encrypted portion, the encrypted portion comprising encrypted data that is received through the one or more portions, the encrypted data including comprising a whole payment account number corresponding to a user account for payment of the transaction, the non-encrypted portion comprising data received through the one or more second portions of the form and metadata indicative of one or more from a group comprising a merchant associated with the transaction, a location of the client device, a deal model associated with the transaction, and a payment method for the transaction;
processing, by the transaction intermediary, the transaction package to extract and store the non-encrypted portion comprising data received through the one or more second portions of the form and metadata in a data list and without decrypting the whole payment account number in the encrypted portion of the transaction package;
determining, by the transaction intermediary and using an analytics engine, a likely acceptance rate of the transaction and a profitability of the transaction based on at least the extracted non-encrypted portion of the transaction package and on users that are previously registered with the transaction intermediary;
determining, by the transaction intermediary, at least one routing location associated with at least one transaction processors based, at least in part, on (i) the location of the client device and (ii) the extracted metadata in the non-encrypted portion of the transaction package that comprises information identifying a location where the encrypted portion of the transaction package is to be decrypted;
routing, using the transaction intermediary, the encrypted portion of the transaction package to the at least one routing location associated with the at least one transaction processors;
storing, by the transaction intermediary, a transmittal indicator indicating that the transaction intermediary has routed the transaction package to the transaction processor;
receiving an indication that the transaction processor has processed the transaction package in response to decrypting the encrypted portion of the transaction package and determining that the transaction information of the transaction package is valid; and
generating, in response to receiving the indication that the transaction processor has processed the transaction package, an electronic voucher for use in a subsequent retail opportunity in response to analyzing a generated token of the indication verifying that the transaction information is valid.

10. The system of claim 9, wherein the operations further comprise:
determining a status of the transaction from the token; and
storing, by the transaction intermediary, information related to the status of the transaction.

11. The system of claim 10, wherein the operations further comprise:
recording the status of the transaction on a list; and updating, in the transaction intermediary, a user account associated with the transaction.

12. The system of claim 9, wherein:
the data to generate the form comprises public key information that (i) is provided by the transaction processor and (ii) provides encryption information to encrypt the data received through the one or more portions of the form; and
the encrypted portion of the transaction package is encrypted using Pretty Good Privacy (PGP) encryption.

13. The system of claim 9, wherein the transaction package comprises at least one of: payment method information; merchant information; and
user identification information.

14. The system of claim 9, wherein storing, by the transaction intermediary, the routing information to route the transaction package to the transaction processor using the extracted non-encrypted portion
of the transaction package comprises determining a location of the transaction processor based on at least data indicative of the location of the client device, the deal model associated with the transaction, and the payment method for the transaction.

15. The system of claim 9, wherein the operations further comprise:
updating, based on at least the extracted non-encrypted portion of the transaction package, the data list with information indicative of a volume of transactions per merchant and a volume of deal models handled at a particular location; and
outputting, in a graphical presentation, the updated information indicative of one or more of the volume of transactions per merchant and the volume of deal models handled at a particular location.

16. The system of claim 15, wherein the operations further comprise:
determining one or more of a profit per transaction or a profit per merchant partnership based on at least the updated information indicative of one or more of the volume of transactions per merchant and the volume of deal models handled at a particular location.

17. A system comprising:
a user device configured to receive transaction information from a user using a form that comprises one or more portions through which data to be encrypted is received and one or more second portions through which data that is not to be encrypted is received, to encrypt the transaction information that comprises the data received through the one or more portions, and to transmit a transaction package that comprises a non-encrypted portion and an encrypted portion, the encrypted portion comprising a whole payment account number corresponding to a user account for payment of the transaction, the non-encrypted portion comprising data received through the one or more second portions of the form and metadata indicative of one or more from a group comprising a merchant associated with the transaction, a location of the user device, a deal model associated with the transaction, and a payment method for the transaction, the encrypted portion comprising the encrypted transaction information;
a transaction intermediary processor configured to:
receive the transaction package from the user device through one or more networks;
process the transaction package to extract and store the non-encrypted portion comprising data received through the one or more second portions of the form and metadata in a data list and without decrypting the whole payment account number in the encrypted portion of the transaction package;
determine, using an analytics engine, a likely acceptance rate of the transaction and a profitability of the transaction based on at least the extracted non-encrypted portion of the transaction package and on users that are previously registered with the transaction intermediary;
determine at least one routing location associated with at least one transaction processors based, at least in part, on (i) the location of the client device and (ii) the extracted metadata in the non-encrypted portion of the transaction package that comprises information identifying a location where the encrypted portion of the transaction package is to be decrypted;
transmit the encrypted portion of the transaction package to the at least one routing location associated with the at least one transaction processors;
store a transmittal indicator indicating that the transaction intermediary processor has routed the transaction package to the transaction processor; and
generate an electronic voucher; and the transaction processor configured to:
receive the encrypted portion of the transaction package from the transaction intermediary processor through one or more networks;
decrypt the encrypted portion of the transaction package;
process the decrypted transaction information; and
transmit an indication to the transaction intermediary processor that the transaction information has been processed successfully in response to determining that the transaction information is valid,
wherein the transaction intermediary processor is an intermediary between the user device and the transaction processor, and is configured to:
generate the electronic voucher in response to receiving the indication that the transaction information has been processed successfully for use in a subsequent retail opportunity in response to analyzing a generated token of the indication verifying that the transaction information is valid; and
transmit the electronic voucher to the user device.

18. The method of claim 1, wherein the whole payment account
number comprises one or more of a whole credit card number and all characters of a user account number associated with a payment for the transaction.

* * * * *